M. A. GRALEY.
TRACTION WHEEL AND MEANS FOR DRIVING SAME.
APPLICATION FILED APR. 14, 1910.
1,059,147. Patented Apr. 15, 1913.
3 SHEETS—SHEET 3.
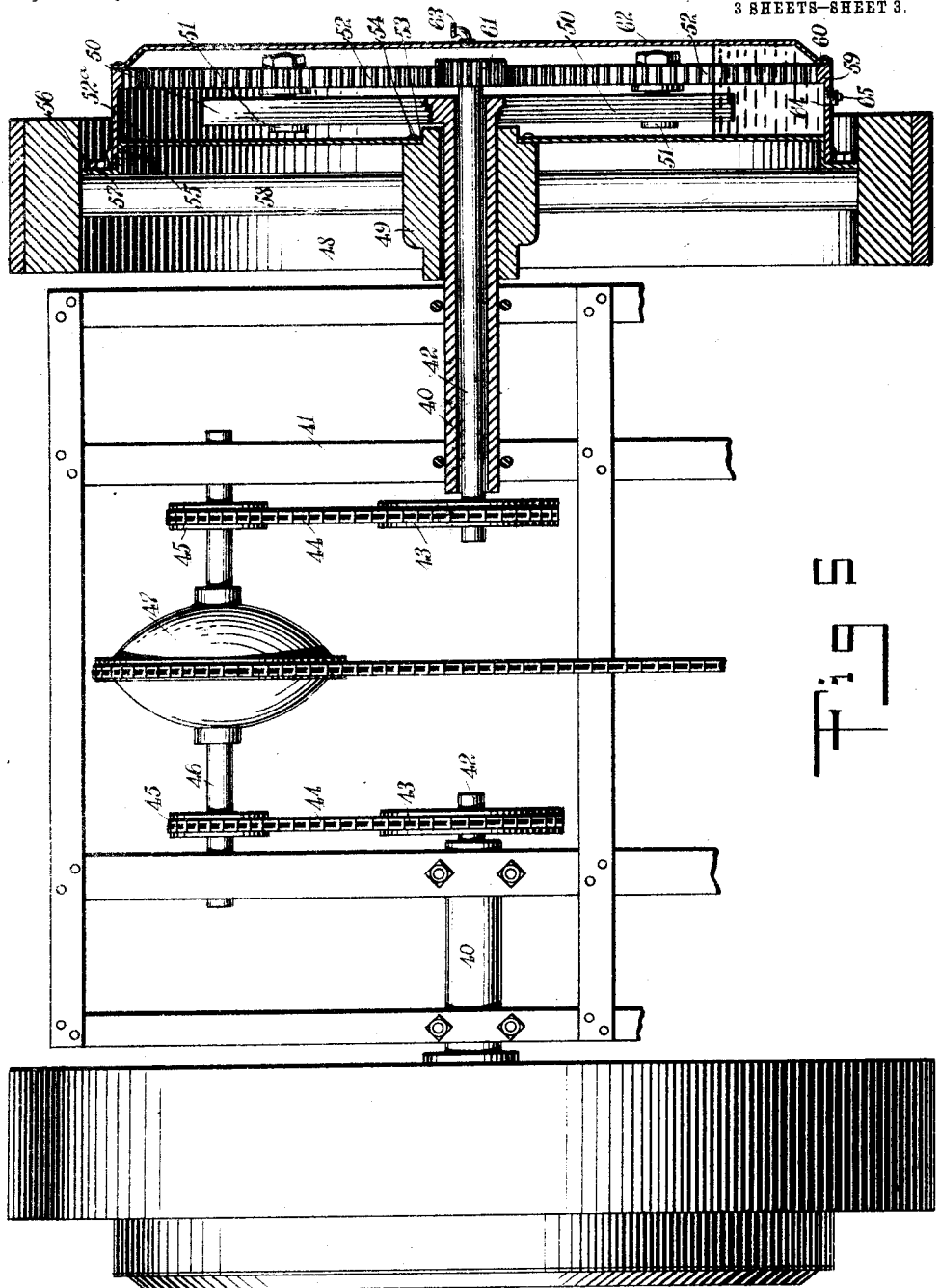
WITNESSES:
INVENTOR
Morton A. Graley
BY
ATTORNEYS

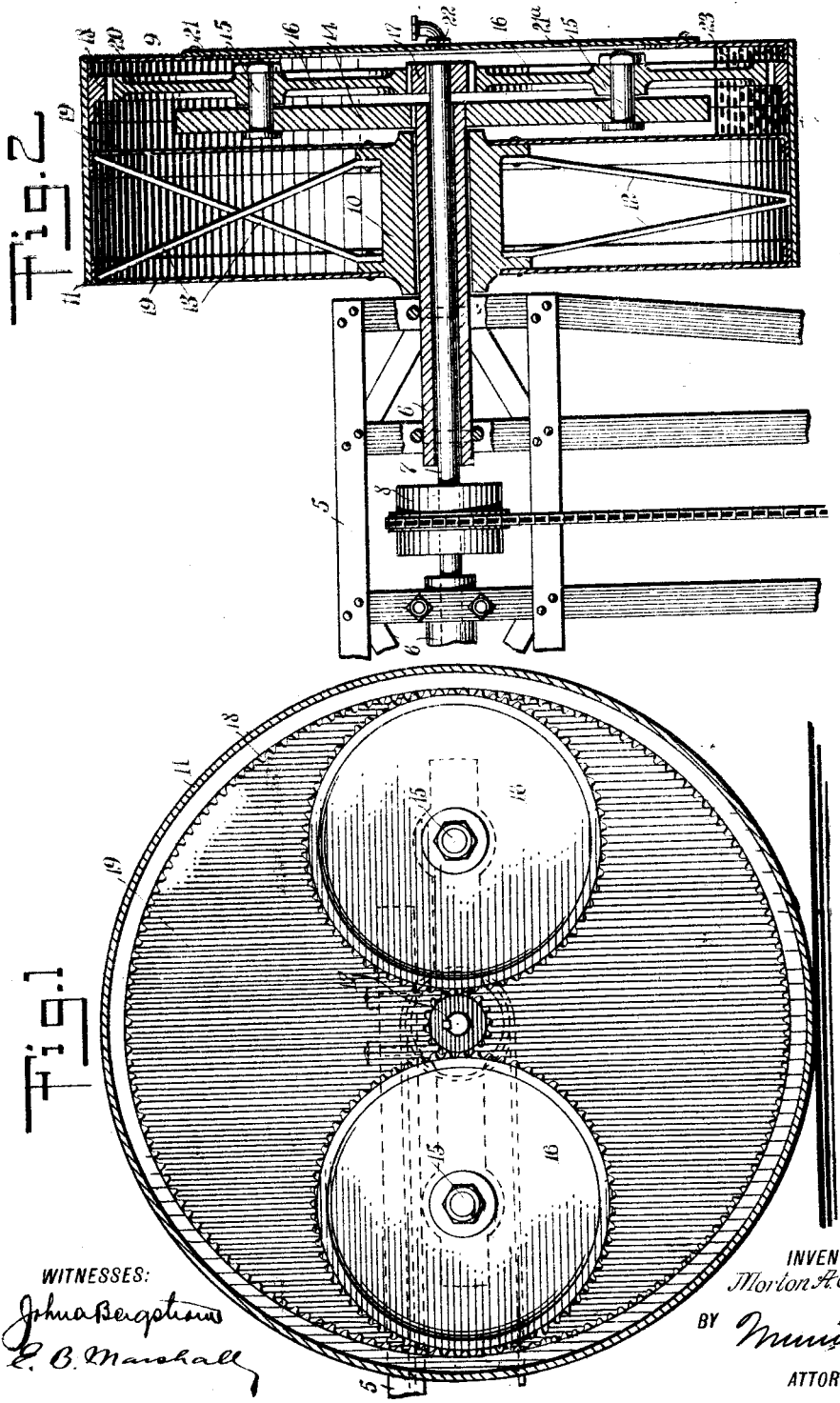

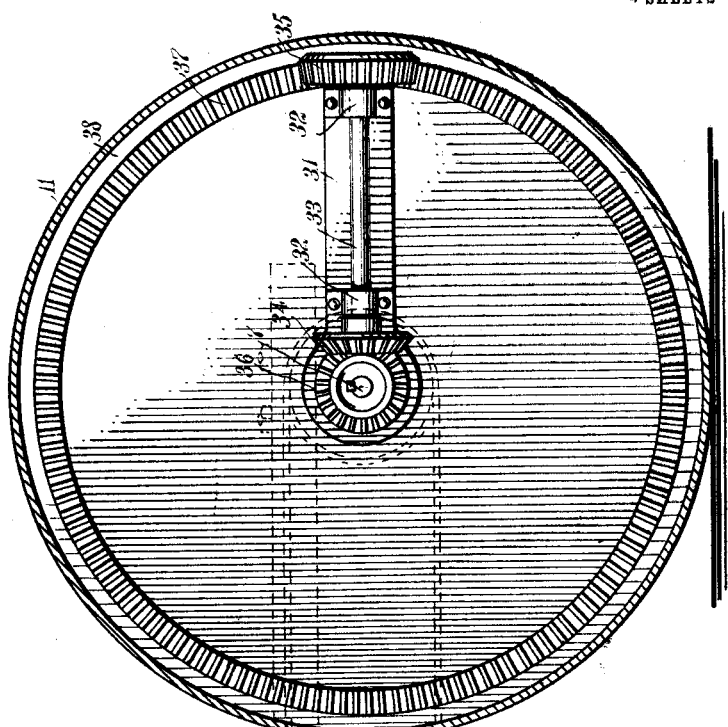
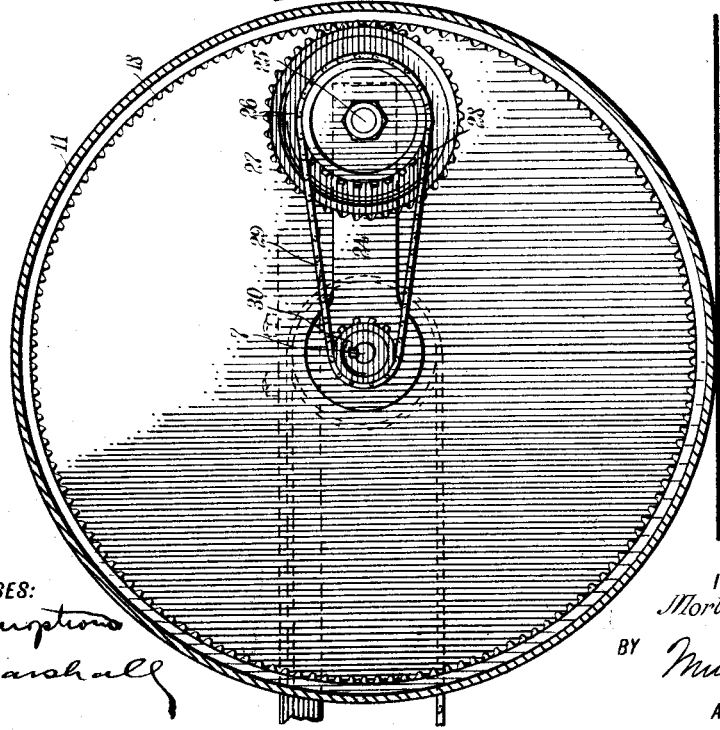

UNITED STATES PATENT OFFICE.

MORTON ADRIAN GRALEY, OF QUEEN CITY, TEXAS.

TRACTION-WHEEL AND MEANS FOR DRIVING SAME.

1,059,147.  Specification of Letters Patent.  Patented Apr. 15, 1913.

Application filed April 14, 1910. Serial No. 555,425.

*To all whom it may concern:*

Be it known that I, MORTON A. GRALEY, a citizen of the United States, and a resident of Queen City, in the county of Cass and State of Texas, have invented a new and Improved Traction-Wheel and Means for Driving Same, of which the following is a full, clear, and exact description.

My invention relates to traction wheels, and it has for its object to construct and mount them on hollow axles so that they may be driven by a shaft disposed in the hollow axles, the gearing by which the vehicle wheels are driven, being disposed within the plane of the sides of the tires, plates being secured to the tires to inclose the said gearing.

Still other objects of the invention will appear in the following complete description.

In this specification I will describe the preferred form of my invention, it being understood that the scope of the invention is defined in the appended claims.

Reference is to be had to the accompanying drawings forming a part of this specification, in which similar characters of reference indicate corresponding parts in all the views, and in which—

Figure 1 is a sectional side elevation of my vehicle wheel; Fig. 2 is a transverse sectional view of the said vehicle wheel, showing the frame and the manner in which it is mounted; Fig. 3 is a side sectional elevation of a vehicle wheel, showing a modified form of my invention; Fig. 4 is a side sectional elevation of a vehicle wheel, showing another modified form of the invention; and Fig. 5 is a plan view partly in section, showing a modification of my invention as it is applied to traction wheels, such as are now in use.

By referring to the drawings it will be seen that to the frame 5 of the vehicle are secured two hollow axles 6, one at each side, a shaft 7 being disposed in the said hollow axles 6, having a differential gear 8 by which it may be driven. On the hollow axles 6 are mounted traction wheels 9, these traction wheels 9 having hubs 10, through the openings in which the hollow axles are disposed. It will be seen, by referring to Fig. 2 of the drawings, that the hub 10 extends from beyond the plane of the side of the rim 11 of the traction wheel, to a point at some distance within the plane of the other side of the said rim 11 of the traction wheel. The hub is secured to the rim 11 by means of spokes 12, there being also braces 13 which connect the hub 10 with the rim 11. The hollow axles 6 extend through the hub 10 and to these hollow axles are secured radially-disposed arms 14 which are two in number and which extend in opposite directions. To the arms 14 are secured studs 15 respectively, gear wheels 16 being mounted to rotate on these studs. The shaft 7 has at each end a gear wheel 17, these gear wheels 17 meshing with the gear wheels 16 respectively, the gear wheels 16 meshing with gear teeth 18 secured to the rim 11 of the traction wheels, these gear teeth 18 being disposed inwardly so that they mesh with the teeth of the gear wheels 16. Two plates 19 are provided, which have annular peripheries and central, circular openings, the said plates 19 being secured, one at each side of the hubs 10 respectively, the plates 19 being also secured to the rim 11 of the traction wheel. The outer plate 19 prevents mud and dirt from reaching the spokes 12 and braces 13, the inner plate 19 being disposed at one side of the arms 14 of the gearing.

Plates 20 are secured to the outer sides of the rims 11 of the traction wheel, the plates 20 having central, circular openings 21, through which the machinist may reach the gearing and make any repairs which may be necessary, and replace the gear wheels should they become broken. Plates 21ª are secured to the plates 20 respectively. The plates 21ª have openings 22 therethrough, through which oil may be fed to the gearing between the inner plate 19 and the plates 20, as shown in Fig. 2 of the drawings. This oil or lubricant 23 is inclosed in a casing formed by the rim 11, the inner plate 19 and the plates 20, the lubricant being thrown over the gearing as the vehicle wheel is rotated, dirt being prevented from reaching the gearing by the inclosing plates.

In the modification shown in Fig. 3 of the drawings, the frame 5, the hollow axles 6 and the shaft 7 are constructed in the same manner as has been described, but instead of having two arms 14, I employ one arm 24, which is secured to the hollow axles 6, a stud 25 being secured to the said arm 24 and a wheel 26 being mounted on the said stud, the said wheel 26 having gear teeth 27 which mesh with the gear teeth 18 disposed inwardly from the rim 11 of the wheel, the wheel 26 also having sprocket teeth 28 which are connected by a sprocket chain 29 with a sprocket wheel 30 secured to the shaft 7. In other respects, the construction is the same, the plates 19 being provided and being secured in the manner set forth with reference to the construction shown in Fig. 2.

In the modification shown in Fig. 4 of the drawings, no change is made in the frame 5, the hollow axles 6 and the shaft 7, which have been described, but only one arm 31 is secured to the said hollow axles 6, this arm 31 having two bearings 32, in which is journaled a shaft 33, bevel gear wheels 34 and 35 being mounted on this shaft 33, one at each end and beyond the bearings 32. The bevel gear wheel 34 meshes with a bevel gear wheel 36 which is secured to the shaft 7 and the bevel gear wheel 35 meshes with teeth 37 which project inwardly from a plate 38 which is used instead of the plate 19 and is secured to the rim 11 of the wheel. The modification shown in Fig. 4 of the drawings is constructed in other respects the same as the construction shown in Figs. 2 and 3 of the drawings.

As my traction wheels are constructed, they are driven by the shaft through gearing which is inclosed between the plates forming a dustproof chamber, the gearing running in oil, as has been set forth. It will also be noted that as the gearing engages the traction wheel, at or near its rim, it will be unnecessary to make the gearing as strong as it would be should another form of construction and arrangement be used. It should also be noted that the gearing on my traction wheel will always be out of the way of stumps and other obstacles which may be found in the roadway.

By referring to Fig. 5 of the drawings, it will be seen that my improvement may be applied to the ordinary type of vehicle wheels which are now in use. When this is done hollow axles 40 are provided which are secured to the frame 41, shafts 42 being journaled in the hollow axles 40 respectively, these shafts 42 having sprocket wheels 43 at their inner ends which are connected with sprocket wheels 45 by sprocket chains 44, the sprocket wheels 45 being mounted on a counter shaft 46. There is a differential gear 47 on the counter shaft 46 which is driven in the usual manner. Traction wheels 48 are mounted on the hollow axles 40, the hollow axles extending beyond the hubs 49 of the wheels and having arms 50 secured to them, the arms being oppositely and radially disposed. Studs 51 are secured to the arms 50, there being gear wheels 52 mounted to rotate on the studs respectively. A casing is secured to the outer side of each of the vehicle wheels, each of the casings consisting of a plate 52ª having an opening 53 through which the hub 49 projects, the plate 52ª being secured to the hub by means of bolts or screws 54. The plate 52ª is bent inwardly at 55, and it has a flange 56 which is secured to the spokes 58 of the wheel by screws or bolts 57. A cylindrical member 59 is bolted to the plate 52ª, there being inwardly disposed gear teeth 60 on the member 59 which are engaged by the gear wheels 52, the gear wheels 52 being engaged by a gear wheel 61 secured to the projecting end of the shaft 42. The cylindrical member 59 is closed at its outer end by means of a plate 62, there being a nipple 63 secured to the plate 62 in an opening therein. There is also an opening in the cylindrical member 59 at 64 which is closed by a plug 65. My improvements are secured to each of the traction wheels in the manner described.

Having thus described my invention, I claim as new and desire to secure by Letters Patent:

1. In a frame a hollow axle secured to the frame, a vehicle wheel having a hub at its inner side mounted on the axle, a rim which extends outwardly beyond the vertical plane at the outer end of the hub, supporting means connecting the hub with the rim, an arm secured to the hollow axle at the outer side of the hub, inwardly extending gear teeth on the rim, a shaft journaled in the hollow axle and having an end projecting from the outer end of the hollow axle, a gear wheel secured to the said end of the shaft, and means on the arm connecting the gear wheel on the shaft with the gear teeth on the rim.

2. In a frame a hollow axle secured to the frame, a vehicle wheel having a hub at its inner side mounted on the axle, and a rim which extends outwardly beyond the vertical plane at the outer end of the hub, supporting means connecting the hub with the rim, a casing member secured at the outer end of the hub, and to the rim, a second casing member secured to the outer side of the rim, and spaced from the first casing member, an arm secured to the hollow axle at the outer side of the hub, and disposed between the two casing members, a stud on the arm, a gear wheel journaled on the stud, gear teeth secured to the rim, meshing with the gear wheel, a shaft journaled in the hollow axle and having an end projecting from the outer end of the hollow axle, a gear wheel secured to the said end of the shaft, the second-mentioned gear wheel meshing with the first-mentioned gear wheel.

In testimony whereof I have signed my name to this specification in the presence of two subscribing witnesses.

MORTON ADRIAN GRALEY.

Witnesses:
 GRACE W. GRALEY,
 J. M. CLEMENTS.

Copies of this patent may be obtained for five cents each, by addressing the "Commissioner of Patents, Washington, D. C."